(12) United States Patent
Pregartner et al.

(10) Patent No.: US 11,111,941 B2
(45) Date of Patent: Sep. 7, 2021

(54) SHALLOW UNDERCUT CONCRETE ANCHOR

(71) Applicant: BLACK & DECKER INC., New Britain, CT (US)

(72) Inventors: Thilo Pregartner, Wiesbaden (DE); Mark Cerbone, White Plains, NY (US); Matthew Chamberlain, Bethel, CT (US)

(73) Assignee: BLACK & DECKER INC., New Britain, CT (US)

( * ) Notice: Subject to any disclaimer, the term of this patent is extended or adjusted under 35 U.S.C. 154(b) by 658 days.

(21) Appl. No.: 15/979,613

(22) Filed: May 15, 2018

(65) Prior Publication Data
US 2018/0258972 A1    Sep. 13, 2018

Related U.S. Application Data

(63) Continuation of application No. PCT/US2016/065508, filed on Dec. 8, 2016.
(Continued)

(51) Int. Cl.
*E04C 5/12* (2006.01)
*B25D 17/02* (2006.01)
(Continued)

(52) U.S. Cl.
CPC .......... *F16B 13/0858* (2013.01); *B23B 51/08* (2013.01); *B25D 17/02* (2013.01);
(Continued)

(58) Field of Classification Search
CPC ......... B23B 51/08; B25D 17/02; E04C 5/122; E04B 2001/3583; E02D 27/01; F16B 13/0858
(Continued)

(56) References Cited

U.S. PATENT DOCUMENTS

| | | | | | |
|---|---|---|---|---|---|
| 3,596,330 | A | * | 8/1971 | Scott | F16G 11/048 24/122.3 |
| 4,447,182 | A | * | 5/1984 | Murbach | F16B 13/066 411/45 |

(Continued)

FOREIGN PATENT DOCUMENTS

WO        9625601 A    8/1996

OTHER PUBLICATIONS

European Search Report dated Aug. 6, 2019.
(Continued)

*Primary Examiner* — Paola Agudelo
(74) *Attorney, Agent, or Firm* — Kofi A. Schulterbrandt

(57) ABSTRACT

A concrete anchor capable of resisting large loads while requiring minimal embedment depth. The system includes a concrete structure including a cylindrical opening in the concrete surface thereof. The system also uses an anchor which includes a sleeve and a plug. The sleeve includes at least two legs extending toward a first end of the sleeve. The plug includes an increasing diameter portion disposed toward a first end of the plug. The plug includes a locking opening. After installation, legs of the sleeve extend radially outward past the wall and the increasing diameter portion prevents inward movement of the legs to lock the sleeve and the plug in turn in the concrete cylindrical opening. Furthermore, dynamic loading on the plug via the locking opening when the anchor is in use generates a dynamic radially outward force on the legs to secure the anchor in the concrete hole.

21 Claims, 17 Drawing Sheets

Related U.S. Application Data

(60) Provisional application No. 62/265,212, filed on Dec. 9, 2015.

(51) Int. Cl.
| | |
|---|---|
| *E04B 5/32* | (2006.01) |
| *F16B 13/08* | (2006.01) |
| *B23B 51/08* | (2006.01) |
| *F16B 13/06* | (2006.01) |
| *F16L 3/00* | (2006.01) |

(52) U.S. Cl.
CPC .............. *E04C 5/122* (2013.01); *F16B 13/06* (2013.01); *F16B 13/0825* (2013.01); *F16B 13/0841* (2013.01); *B23B 2226/75* (2013.01); *B25D 2222/72* (2013.01); *E04B 5/32* (2013.01); *E04B 2103/02* (2013.01); *F16L 3/00* (2013.01)

(58) Field of Classification Search
USPC .............................................. 411/429, 15, 33
See application file for complete search history.

(56) References Cited

U.S. PATENT DOCUMENTS

| | | | | |
|---|---|---|---|---|
| 5,458,448 | A * | 10/1995 | Cheng ................. | F16B 13/0866 411/33 |
| 5,630,301 | A * | 5/1997 | Sieg ........................ | E04C 5/122 24/115 M |
| 5,816,759 | A * | 10/1998 | Ernst ..................... | F16B 13/066 411/24 |
| D557,409 | S * | 12/2007 | Veliss ....................... | D24/110.1 |
| 9,097,014 | B1 * | 8/2015 | Sorkin .................... | E04C 5/122 |
| 10,047,777 | B2 * | 8/2018 | Andou ................. | E21D 21/0026 |
| 2002/0028122 | A1 * | 3/2002 | Kuo ..................... | F16H 25/2219 411/429 |
| 2002/0062618 | A1 | 5/2002 | Pourtier | |
| 2002/0076298 | A1 * | 6/2002 | Gauthier ................. | F16B 13/12 411/57.1 |
| 2012/0017421 | A1 * | 1/2012 | Bland ................. | F16B 13/0841 29/525.05 |
| 2012/0076615 | A1 * | 3/2012 | Hsu ..................... | F16B 13/0858 411/429 |

OTHER PUBLICATIONS

Simpson Strong-Tie: "Hollow Drop-In Internally Threaded Anchor", Anchoring and Fastening Systems for Concrete and Masonry, Nov. 1, 2015, pp. 236-238, XP009511480.

\* cited by examiner

SUMMARY IN HOUSE TESTS

SERIES 7: LOW STRENGTH CRACKED CONCRETE, RELIABILITY

| TEST SERIES | ANCHOR DIAMETER IN. | $h_{ef}$ IN. | TEST NUMBER | $f_{u, test, 1}$ lbf | $N_{b,o,m}$ lbf | COV % | FAILURE MODE | DISP BEHAVIOR | $f_{c, test, 1}$ psi | $f_{c, nom}$ psi | NORM FACTOR | $N_{u, test, 1}$ lbf | $N_{b,o,m}$ lbf | COV % | $N_{b,r,5\%}$ lbf | k, 5% lbf | $N, b r/ N, b o. 3$ | CATEGORY 1,2,3 |
|---|---|---|---|---|---|---|---|---|---|---|---|---|---|---|---|---|---|---|
| 7 | 5/8 | 3/4 | 1 | 902 | 1074 | 17.1% | CC | OK | 3135 | 2500 | 0.50 | 805 | 959 | 17.1% | 402 | 12 | 0.533252 | NO (TIGHTER COV/ MORE SAMPLES) |
|   |     | 3/4 | 2 | 1060 |   |   | CC | OK | 3135 | 2500 |   | 1035 |   |   |   |   |   |   |
|   |     | 3/4 | 3 | 855  |   |   | CC | OK | 3135 | 2500 |   | 764  |   |   |   |   |   |   |
|   |     | 3/4 | 4 | 1185 |   |   | CC | OK | 3135 | 2500 |   | 1058 |   |   |   |   |   |   |
|   |     | 3/4 | 5 | 1267 |   |   | CC | OK | 3135 | 2500 |   | 1131 |   |   |   |   |   |   |

SERIES 8: HIGH STRENGTH CRACKED CONCRETE, RELIABILITY

| TEST SERIES | ANCHOR DIAMETER IN. | $h_{ef}$ IN. | TEST NUMBER | $f_{u, test, 1}$ lbf | $N_{b,o,m}$ lbf | COV % | FAILURE MODE | DISP BEHAVIOR | $f_{c, test, 1}$ psi | $f_{c, nom}$ psi | NORM FACTOR | $N_{u, test, 1}$ lbf | $N_{b,o,m}$ lbf | COV % | $N_{b,r,5\%}$ lbf | k, 5% lbf |
|---|---|---|---|---|---|---|---|---|---|---|---|---|---|---|---|---|
| 8 | 5/8 | 3/4 | 1 | 1653 | 1694 | 19.3% | CC | OK | 5708 | 6500 | 0.50 | 1764 | 1807 | 19.3% | 624 | 12 |
|   |     | 3/4 | 2 | 1367 |   |   | CC | OK | 5708 | 6500 |   | 1459 |   |   |   |   |
|   |     | 3/4 | 3 | 2242 |   |   | CC | OK | 5708 | 6500 |   | 2392 |   |   |   |   |
|   |     | 3/4 | 4 | 1606 |   |   | CC | OK | 5708 | 6500 |   | 1714 |   |   |   |   |
|   |     | 3/4 | 5 | 1600 |   |   | CC | OK | 5708 | 6500 |   | 1707 |   |   |   |   |

SERIES 14: SHEAR, LOW STRENGTH UNCRACKED CONCRETE

| TEST SERIES | ANCHOR DIAMETER IN. | $h_{ef}$ IN. | TEST NUMBER | $f_{u, test, 1}$ lbf | $N_{b,o,m}$ lbf | COV % | FAILURE MODE | DISP BEHAVIOR | $f_{c, test, 1}$ psi | $f_{c, nom}$ psi | NORM FACTOR | $N_{u, test, 1}$ lbf | $N_{b,o,m}$ lbf | COV % | $N_{b,r,5\%}$ lbf | k, 5% lbf |
|---|---|---|---|---|---|---|---|---|---|---|---|---|---|---|---|---|
| 14 | 5/8 | 3/4 | 1 | 2569 | 2689 | 15.5% | CC | OK | 3281 | 2500 | 0.50 | 2242 | 2347 | 15.5% | 1109 | 34 |
|    |     | 3/4 | 2 | 3101 |   |   | CC | OK | 3281 | 2500 |   | 2733 |   |   |   |   |
|    |     | 3/4 | 3 | 2360 |   |   | CC | OK | 3281 | 2500 |   | 2060 |   |   |   |   |
|    |     | 3/4 | 4 | 2257 |   |   | CC | OK | 3281 | 2500 |   | 1970 |   |   |   |   |
|    |     | 3/4 | 5 | 3126 |   |   | CC | OK | 3281 | 2500 |   | 2729 |   |   |   |   |

FIG. 11A

SUMMARY IN HOUSE TESTS

SERIES 7: LOW STRENGTH CRACKED CONCRETE RELIABILITY

| TEST SERIES | ANCHOR DIAMETER in. | $h_{ef}$ in. | TEST NUMBER | $f_{u, test, 1}$ lbf | $N_{b,o,m}$ lbf | COV % | FAILURE MODE | DISP BEHAVIOR | $f_{c, test, 1}$ psi | $f_{c, nom}$ psi | NORM FACTOR | $N_{u, test, 1}$ lbf | $N_{b,o,m}$ lbf | COV % | $N_{b,r,5\%}$ lbf | k, 5% lbf |
|---|---|---|---|---|---|---|---|---|---|---|---|---|---|---|---|---|
| 7 | 5/8 | 1 | 1 | 1207 | 1078 | 16.4% | CC | OK | 3158 | 2500 | 0.50 | 1074 | 959 | 16.4% | 424 | 8 |
|   |     |   | 2 | 944  |      |       | CC | OK | 3158 | 2500 |      | 840  |     |       |     |   |
|   |     |   | 3 | 987  |      |       | CC | OK | 3158 | 2500 |      | 878  |     |       |     |   |
|   |     |   | 4 | 929  |      |       | CC | OK | 3158 | 2500 |      | 827  |     |       |     |   |
|   |     |   | 5 | 1323 |      |       | CC | OK | 3158 | 2500 |      | 1177 |     |       |     |   |

SERIES 8: HIGH STRENGTH CRACKED CONCRETE RELIABILITY

| TEST SERIES | ANCHOR DIAMETER in. | $h_{ef}$ in. | TEST NUMBER | $f_{u, test, 1}$ lbf | $N_{b,o,m}$ lbf | COV % | FAILURE MODE | DISP BEHAVIOR | $f_{c, test, 1}$ psi | $f_{c, nom}$ psi | NORM FACTOR | $N_{u, test, 1}$ lbf | $N_{b,o,m}$ lbf | COV % | $N_{b,r,5\%}$ lbf | k, 5% lbf |
|---|---|---|---|---|---|---|---|---|---|---|---|---|---|---|---|---|
| 8 | 5/8 | 1 | 1 | 1266 | 1528 | 16.2% | PO/C | OK | 5749 | 2500 | 0.50 | 848  | 1007 | 16.2% | 454 | 9 |
|   |     |   | 2 | 1917 |      |       | CC   | OK | 5749 | 2500 |      | 1284 |      |       |     |   |
|   |     |   | 3 | 1360 |      |       | CC   | OK | 5749 | 2500 |      | 897  |      |       |     |   |
|   |     |   | 4 | 1590 |      |       | CC   | OK | 5749 | 2500 |      | 1049 |      |       |     |   |
|   |     |   | 5 | 1465 |      |       | PO/C | OK | 5749 | 2500 |      | 979  |      |       |     |   |

FIG. 11B

SHALLOW UNDERCUT CONCRETE ANCHOR

CROSS-REFERENCE TO RELATED APPLICATIONS

This is a continuation application of PCT/US2016/065508, filed Dec. 8, 2016, which incorporates by reference and derives priority from U.S. Provisional Application No. 62/265,212 filed on Dec. 9, 2015.

BACKGROUND OF THE INVENTION

Post-tensioned (PT) slabs are typically flat slabs, band beam slabs or ribbed slabs. PT slabs offer the thinnest slab type, as the tensile stress to which the slab is exposed is limited by a compressive wire system. Longer spans can be achieved due to pre-stress, which can be used to counteract deflections. The slabs are pre-stressed by cables/wires that pass through the slabs.

PT slabs are becoming more widely used for a number of reasons. Slabs can be thinner which will usually result in cost savings at least as a result of using less cement. In addition, less material necessarily means that the slabs are more environmentally friendly. Thinner lighter slabs lend to faster and easier construction/erection processes. Furthermore, PT slab concrete structures can usually bear load sooner than other conventional load bearing structures if not immediate. In fact, PT slabs are already the most common type of reinforcing floors (e.g., in high-rise construction and parking garages).

FIG. 1 shows a PT slab having wire passing through it which wires are secured and tensioned at outer ends of the slab. When individual slab units are combined in the construction of a building structure, that structure will sometimes require anchors attached thereto. The anchors support various systems such as plumbing or electrical equipment. For example, an anchor may be secured in a PT slab which forms the ceiling in a building (e.g., a parking deck) so that a threaded rod can be supported from the anchor which threaded rod in turn supports piping for the building's sprinkler system.

Most PT slabs have three options for anchoring. First, anchors may be positioned before the concrete is poured and thereby are cast in place. Post cast anchors are available in the industry that require drilling into the set concrete, inserting an anchor, and expanding the anchor to grip and secure itself in the hole. Because PT slabs are relatively flat/thin, the cables/wires that pass through the concrete are generally close to the surface of the concrete. Specifically, wire can be located as close as 1 or 2 inches from the slab concrete surface. Therefore, the location of and depth to which holes can be drilled for insertion of post cast anchors is limited. In fact, to ensure that drilled holes are not improperly installed, builders presently use slow and expensive radiography equipment to locate cable/wire within the cast PT slab. In any case (by some building codes) holes for receiving post cast anchors cannot be drilled to greater than a ¾" depth.

As mentioned above, many of the anchors that will be secured in a concrete slab can be preset anchors. On the other hand, for various reasons it may not be possible or desirable to utilize preset anchors. Therefore, after the slab has been cast there will frequently be a need to install a support mechanism for an auxiliary building system (e.g., plumbing, electrical, etc.). There is therefore a need to develop a system which utilizes a post cast concrete anchor for securing within a drilled hole that is ¾" or less in depth. There is also a need to develop such an anchor that can bear a minimum load under various standard test conditions.

SUMMARY OF THE INVENTION

The present invention discloses a shallow undercut concrete anchor capable of resisting large loads while requiring a ¾" embedment depth of less. Specifically, the present invention discloses an anchor system for securing an object (e.g. a pipe system) to a structure (e.g., a parking deck or slab of a high rise or other building). The system includes a concrete structure including a cylindrical opening in the concrete surface thereof. The concrete cylindrical opening can include an open end and a closed end. The system also uses an anchor which includes a sleeve and a plug. The sleeve includes at least two legs extending toward a first end of the sleeve and the sleeve also includes a second end. The sleeve further including a cylindrical through opening from the first end to the second end. The plug includes a first end and a second end and the plug also includes an increasing diameter portion disposed toward a first end of the plug. Furthermore, the plug including a locking opening. The second end of the plug is received in the cylindrical through opening until the increasing diameter portion engages the legs. The locking opening of the plug is accessible through the cylindrical through opening at the second end of the sleeve. The concrete cylindrical opening includes a cylindrical wall having a radius and a depth of approximately ¾" or less. The anchor, via the first ends of the sleeve and plug respectively is received in the concrete cylindrical opening to approximately the depth. After installation, legs of the sleeve extend radially outward past the wall and the increasing diameter portion prevents inward movement of the legs to lock the sleeve and the plug in turn in the concrete cylindrical opening. Furthermore, dynamic loading on the plug (e.g., via a threaded rod) when the anchor is in use generates a dynamic radially outward force on the legs to secure the anchor in the concrete hole.

BRIEF DESCRIPTION OF THE DRAWINGS

FIG. 11A shows a table of values from which to determine reliability of the anchor of FIG. 3 under various installation conditions.

FIG. 11B shows a table of values from which to determine reliability of the anchor of FIG. 3 under various installation conditions.

DETAILED DESCRIPTION OF THE INVENTION

Figure 1:
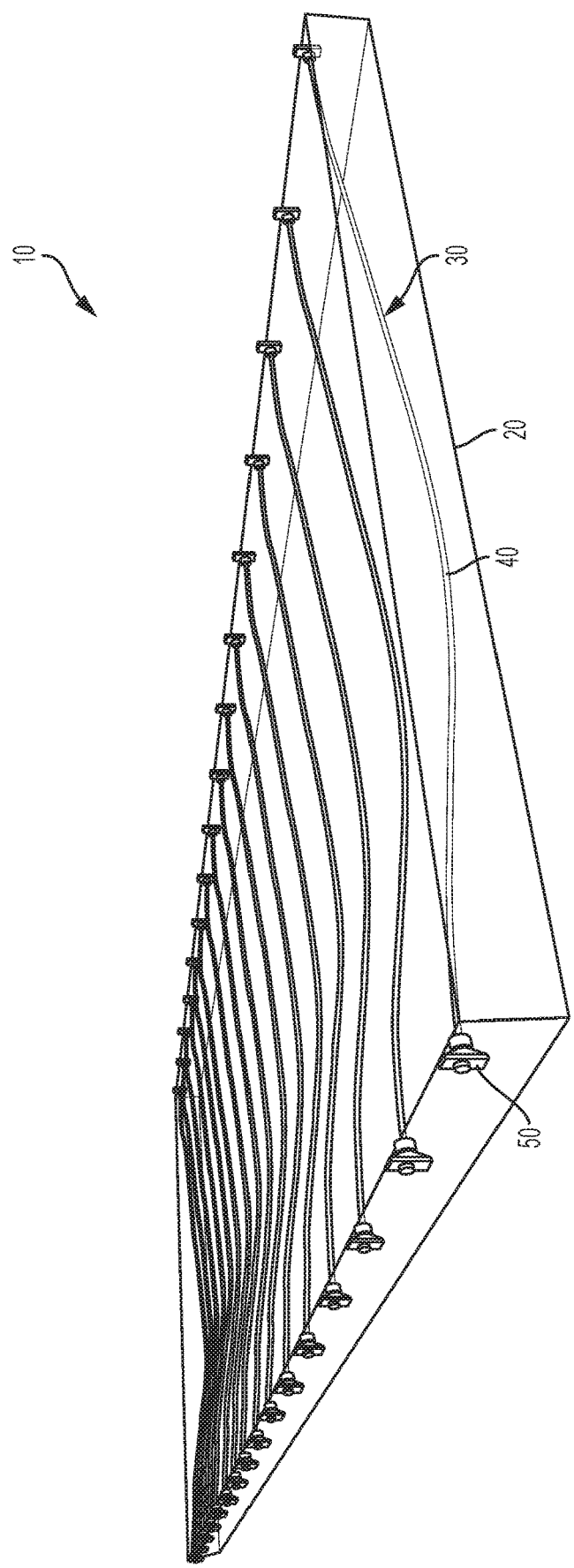
FIG. 1 shows an embodiment of the general concept of the type of slab in which the present invention anchor can be installed.

FIG. 1 shows a post stressed concrete slab unit 10. Slab unit 10 includes a volume (e.g., a rectangular volume) of poured and cured concrete 20 and a plurality of tension wires 30 passing through the concrete volume 20. An individual wire 40 may be disposed at different depths in the direction of thickness of the slab based on loads expected to be experienced at particular areas of the slab when installed. Wires anchors 50 are positioned at outer surfaces of concrete 20 and tension of wires 30 may be adjusted there. With respect to the top and bottom outer surfaces of the concrete slab 20, wire 40 may be positioned within 1 or 2 inches of the outer surfaces of the concrete.

Some post cast anchors are used in PT slabs today. For example mini drop-in anchors with the following characteristics are used.

| Thread Diameter [in.] | ¼" | ⅜" | ½" |
|---|---|---|---|
| Drill Bit Diameter [in.] | ⅜ | ½ | ⅝ |
| Embedment depth [in.] | ⅝ (16 mm) | ¾ | 1 (25.4 mm) |
| Threaded Depth [in.] | ⅜ | 13/32 | ⅝ |
| Installation Torque [ft-lbs] | 3 | 5 | 10 |

Figure 2:
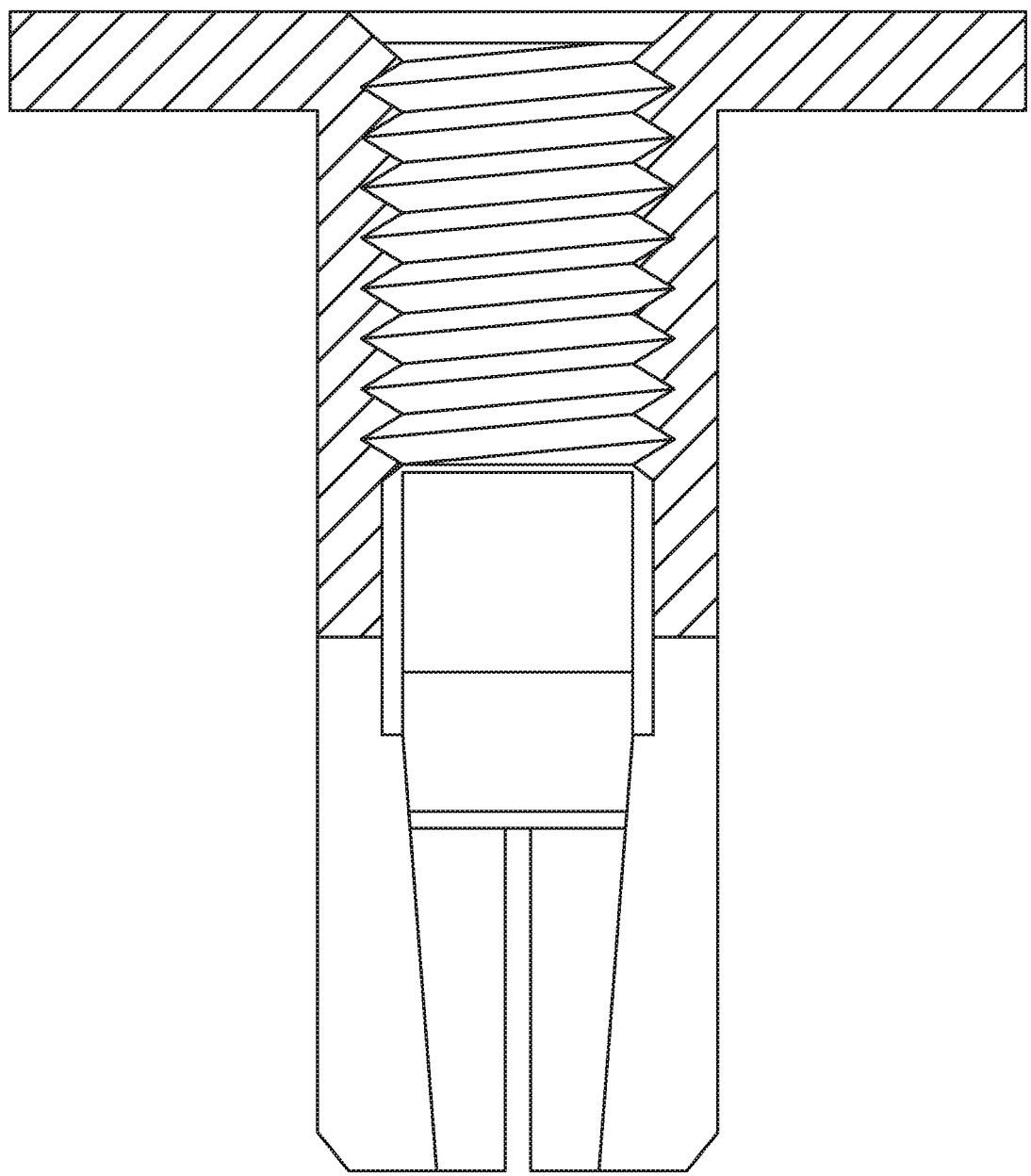
FIG. 2 shows a cross-sectional view of an embodiment of a conventional anchor for use in the slab of FIG. 1.
Figure 7A:
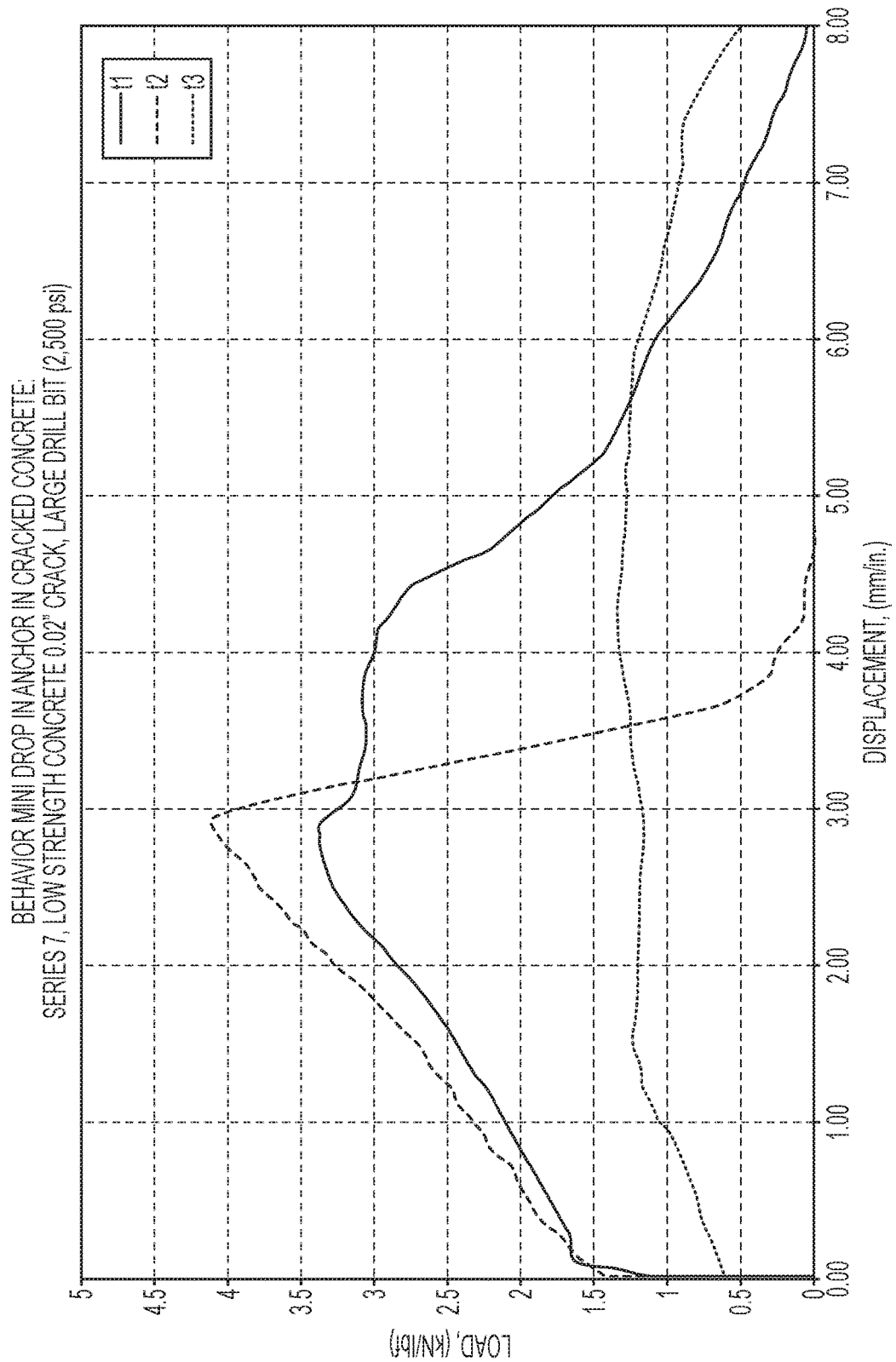
FIG. 7A shows a graph of load vs. displacement of the anchor of FIG. 2.
Figure 7B:
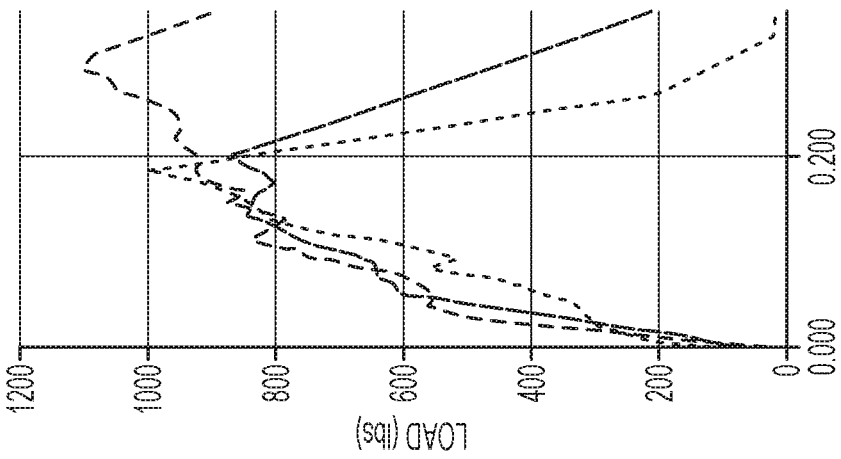
FIG. 7B shows a graph of another load vs. displacement of the anchor of FIG. 2.
Figure 7C:
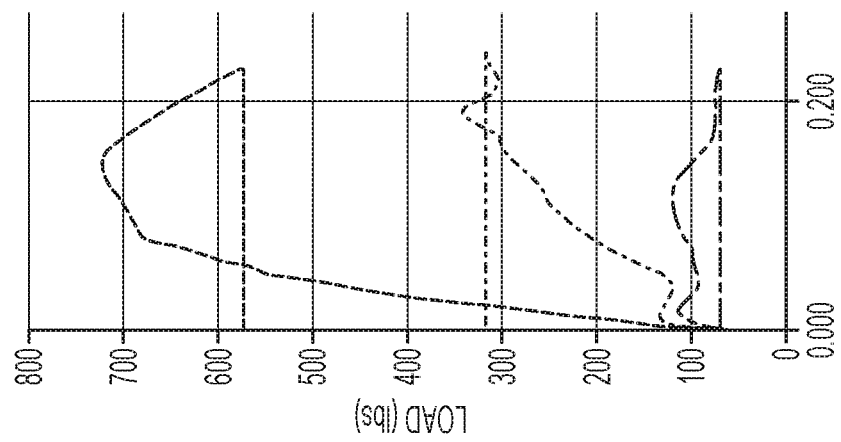
FIG. 7C shows yet another graph of load vs. displacement of the anchor of FIG. 2.

These mini drop-in anchors utilize a friction mechanism to resist pull out failure. FIG. 2 shows a cross section of the prior art mini drop-in anchor design. At a relatively low load the friction mechanism fails with the anchor being pulled out of the concrete hole. FIGS. 7A-7C illustrate some experimental results that show pull out failures of mini drip-in anchors at specific loads in un-cracked concrete. The graph in FIG. 7A plots load in terms of displacement (i.e., movement of the anchor out of the hole). The graph clearly shows steady movement of the anchor out of the hole as load in the desired load range increases. Similarly, FIGS. 7B and 7C show graphed results of load in terms of displacement for a desired load when mini drop-in anchors are set in cracked concrete. FIGS. 7B and 7C clearly show that the anchors reach an unacceptable displacement during the desired load range and then completely fail. There is therefore a need to develop an anchor with an embedment depth of ¾" or less that can consistently bear larger loads.

Anchor Structure

Figure 4:
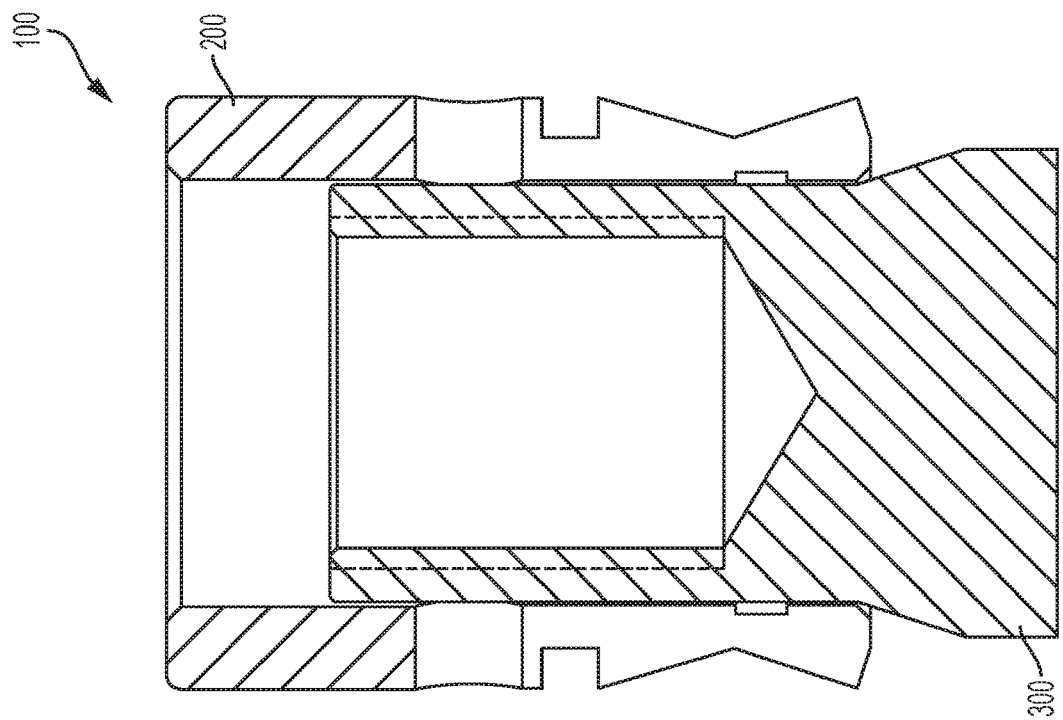
FIG. 4 shows a cross-sectional view of the preset anchor of FIG. 3.
Figure 3:
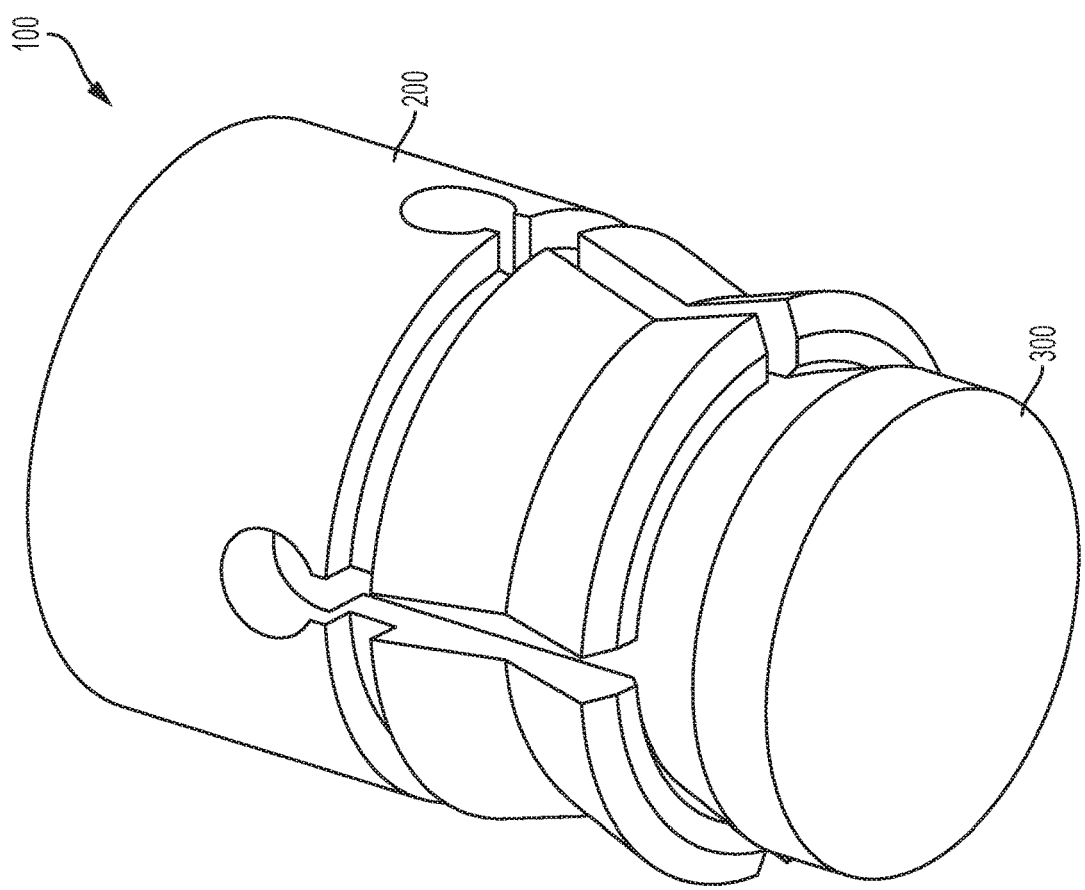
FIG. 3 shows a bottom perspective view of an embodiment of the anchor of the present invention.
Figure 5A:
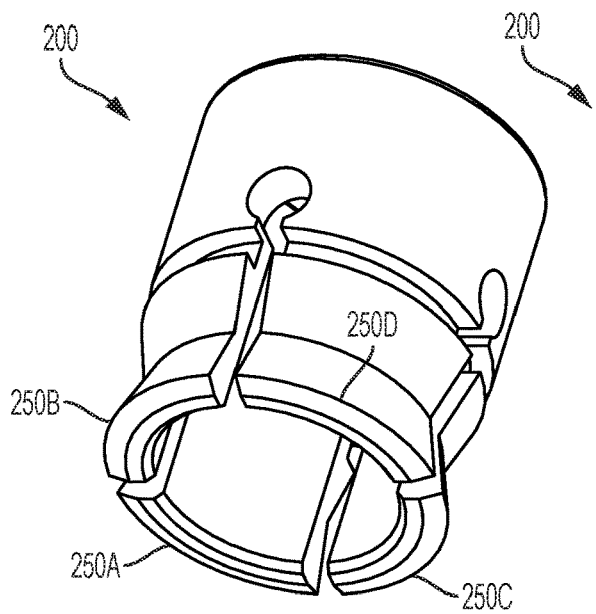
FIG. 5A shows a perspective view of an embodiment of a sleeve of the anchor of FIG. 3.
Figure 5B:
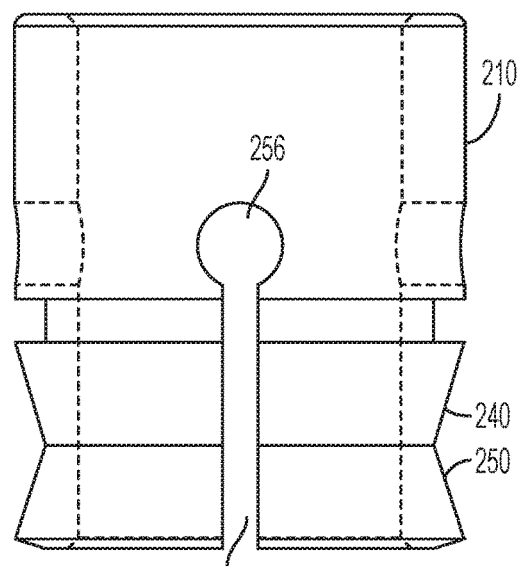
FIG. 5B shows a front view of the anchor of FIG. 3.
Figure 5C:
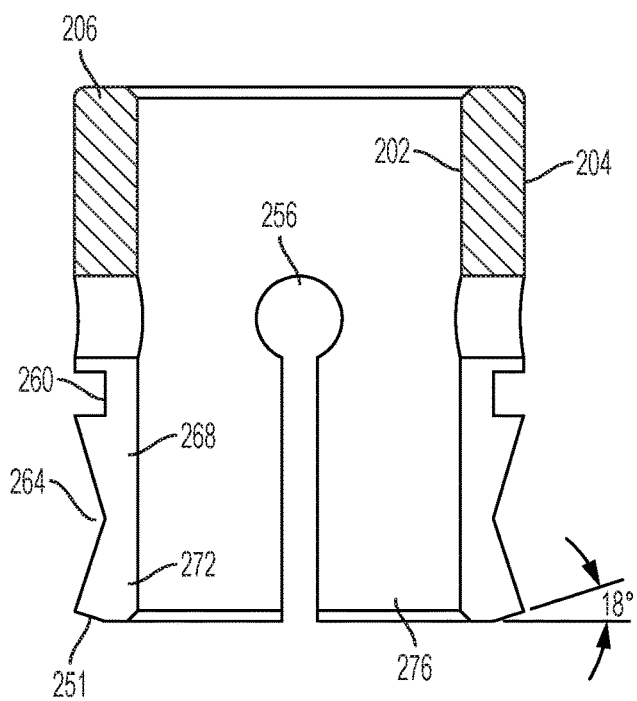
FIG. 5C shows a cross sectional view of the sleeve of the anchor of FIG. 3.
Figure 5D:
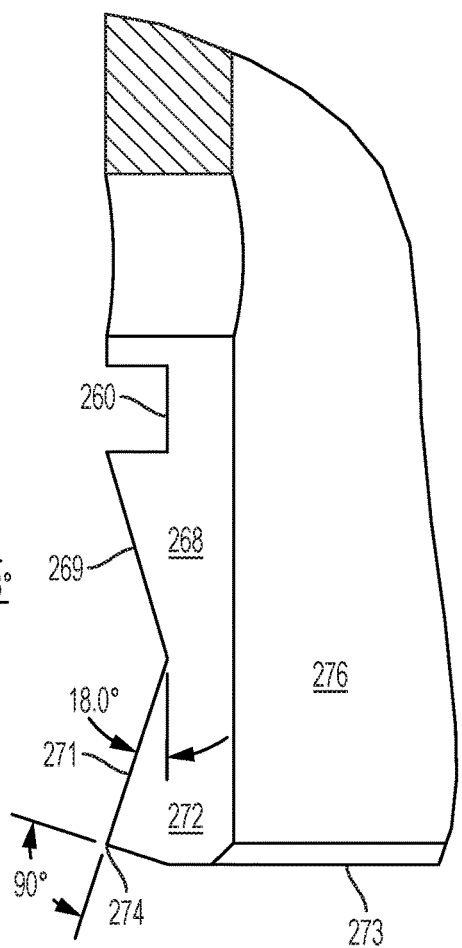
FIG. 5D shows an enlarged cross sectional view of a portion of the sleeve of the anchor of FIG. 3.

The structure of the present invention will now be described with respect to FIGS. 3-6. FIG. 3 shows a perspective view of the shallow undercut anchor 100 of the present invention in its assembled, but preset configuration. In this assembled configuration a plug 300 is received in a sleeve 200. FIG. 4 shows a cross-section of the plug and sleeve anchor of FIG. 3. FIG. 5A shows a perspective view of sleeve 200. Sleeve 200 is of a generally cylindrical form having an inner cylindrical surface 202 and an outer generally cylindrical surface 204 both of which define a sleeve wall 206 between. Inner cylindrical surface 202 includes a chamfer at its upper and lower ends for ease of insertion of plug 300 and threaded rods (described in further detail below). Sleeve 200 also includes an upper portion 210 and a lower portion 240. At an interface between upper portion 210 and lower portion 240 is a recessed waistband 260 in wall 206. Lower portion 240 includes a plurality of legs 250A-D that extend downward from recessed waistband 260. Between each pair of adjacent legs 250 is a gap 254. Gap 254 extends from lower portion 240 to upper portion 210. Specifically, gap 256 extends from a lowermost end of the legs 250 upward through recessed waistband 266 and terminating at an annular stress relief opening 256.

Legs 250 of lower portion 240 can be said to include an upper portion 268 connected to a lower portion 272. Lower portion 272 includes a converging edge 274 which engages the concrete hole wall during installation. The shape of the converging edge (about 90°) ensures that the pressure exerted on the concrete hole wall will be large to encourage cutting into the concrete.

The outer generally cylindrical surface 204 at lower portion 240 includes a V-shaped recess 264. V-shaped recess 264 extends between recessed waistband 260 and a lower terminal end 273 of legs 250. Furthermore. V-shaped recess 264 extends radially inward so that a mouth of the V-shape opens radially outward creating a smaller wall radius at the point/apex of the V and defining a thinner wall section at the point of the V. The wall section being thinner at the point/apex of the V since generally inner cylindrical surface 202 maintains a constant radius through sleeve 200. The two legs of the V forming recess 264 define outer wall surface portions 269, 271 that are disposed approximately 144° apart.

Figure 6A:
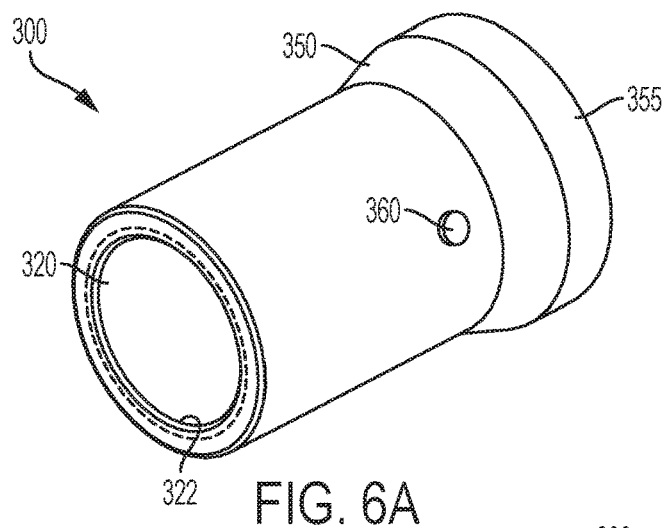
FIG. 6A shows a perspective view of the plug of the anchor of FIG. 3.
Figure 6B:
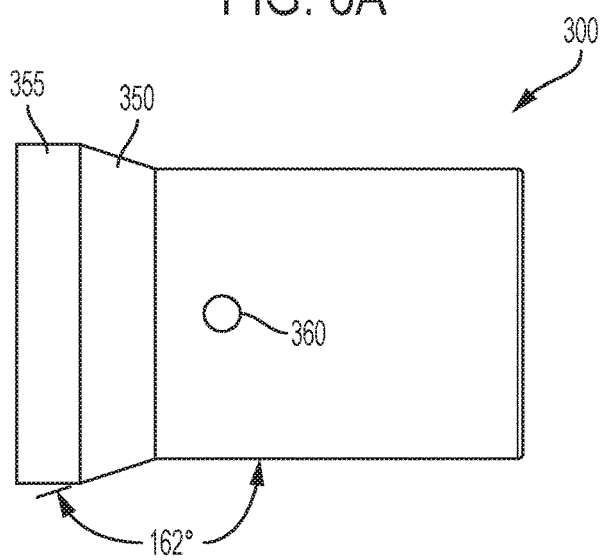
FIG. 6B shows a side view of the plug of the anchor of FIG. 3.
Figure 6C:
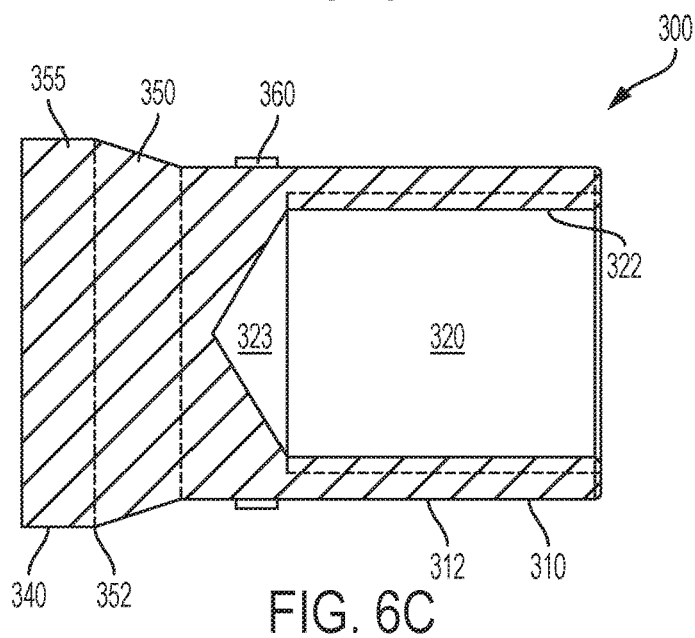
FIG. 6C shows a cross-sectional view of the plug of the anchor of FIG. 3.

Plug 300 will now be described with reference FIGS. 6A-6C. FIG. 6A shows a perspective view of plug 300 of anchor 100. Plug 100 is made of steel or similar strength metals or materials. FIGS. 6B and 6C show that plug 300 includes a generally cylindrical upper portion 310, a generally cylindrical lower portion 355 and an increasing diameter portion 350 connecting the lower portion 355 to the upper portion 310. The increasing or tapered radius portion includes a first radius and a second increased radius and upper portion 310 connects to increasing diameter portion 350 at the first diameter. Similarly, lower portion 355 connects to increased diameter portion 350 at the second increased diameter. Upper portion 310 includes an outer surface 312 and an interior opening 320. Opening 320 includes an inner wall surface 322 which is fitted with a locking mechanism such as a female threaded (e.g., for receiving a male threaded rod). Opening 322 is further defined by a cone shaped volume or opening 323 in a bottom of opening 322. Outer surface 312 further includes a boss or projection 360 which engages with a shaped recess of sleeve 200 to secure plug 300 to sleeve 200 and keep the two parts together as an anchor until anchor 100 is to be installed.

Prior Art Performance

FIG. 7A shows a graph of load vs. displacement of the prior art anchor of FIG. 2 in cracked 2,500 psi concrete. The various trials (i.e., t1-t3) show a steady undesirable displacement of the anchor out of the sleeve as load (i.e. a pulling out load) is applied. A steeper curve would be more desirable but could not be achieved with the prior art anchor solution. Similarly, FIGS. 7B and 7C show graphs of load vs. displacement of the prior art anchor of FIG. 2.

Installation Mechanism

Figure 8B:
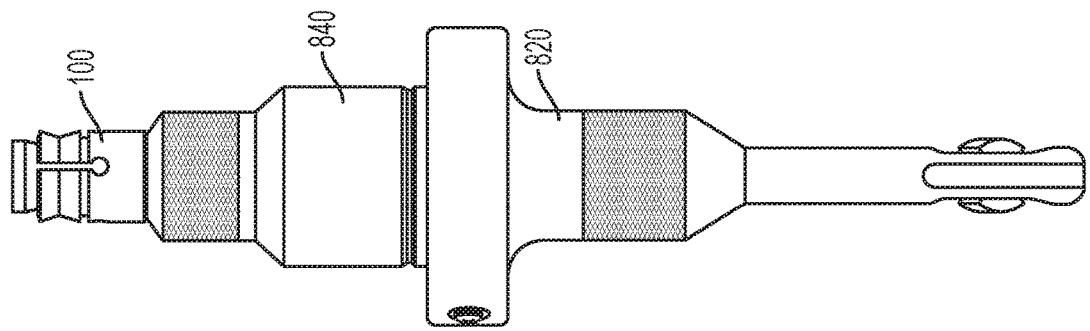
FIG. 8B shows an assembled drilling and setting system of the anchor of FIG. 3.
Figure 8A:
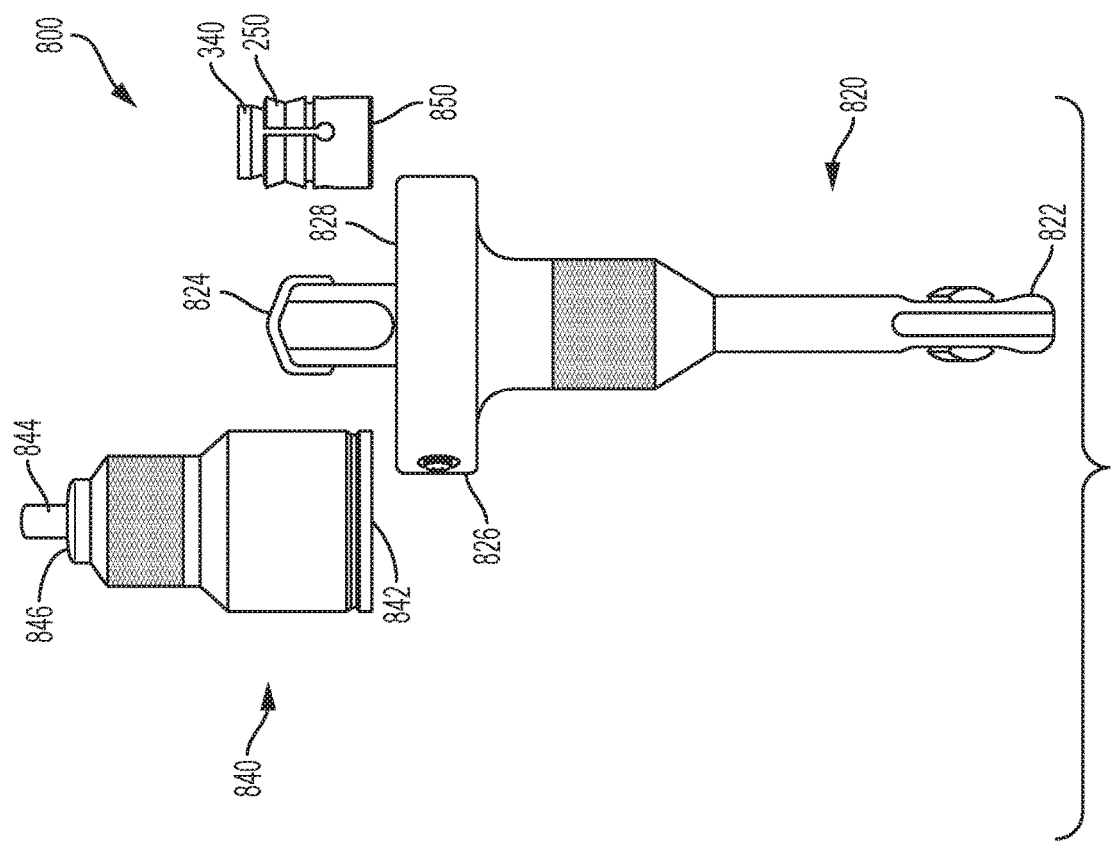
FIG. 8A shows an exploded drilling and setting system of the anchor of FIG. 3.

FIG. 8A shows an installation mechanism 800 with which anchor 100 of the present invention can be installed. Specifically, installation mechanism 800 includes a drill bit mechanism 820 and an impact installation tool 840. Drill bit mechanism 820 includes a chuck receiving portion 822 for being received in a power tool such as a power hammer or hammer drill. Drill bit mechanism 820 also includes a bit 824 for drilling a suitably sized hole in concrete (e.g., a post tensioned slab). A flange 826 is also provided on drill bit mechanism 820 with a surface 828 for controlling a depth to which bit 824 enters the concrete and gauging the angle in which the hole is being drilled.

Impact installation tool 840 includes a receptacle 842 for receiving bit 824 and includes a guide 844. Impact installation tool 840 also includes a shoulder 846 for limiting the axial distance guide 844 is inserted into upper portion 210 anchor 100. As shown in FIG. 8B, after a hole is drilled in the concrete using drill bit mechanism 820, impact installation tool 840 is place over bit 824 until impact installation tool 840 engages surface 828. Similarly, anchor 100 is placed over guide 844 with guide 844 being received in opening 320 of sleeve 200 until a topmost portion 850 of sleeve 200 engages shoulder 846.

Figure 8D:
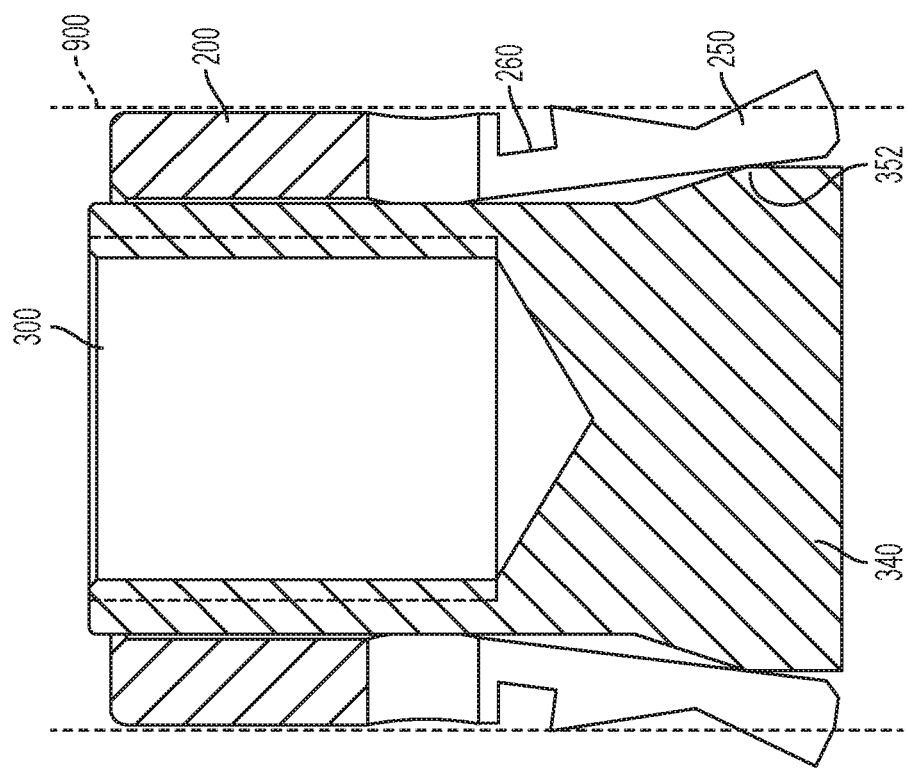
FIG. 8D shows a cross-sectional view of the anchor of FIG. 3 in the post set configuration.
Figure 8C:
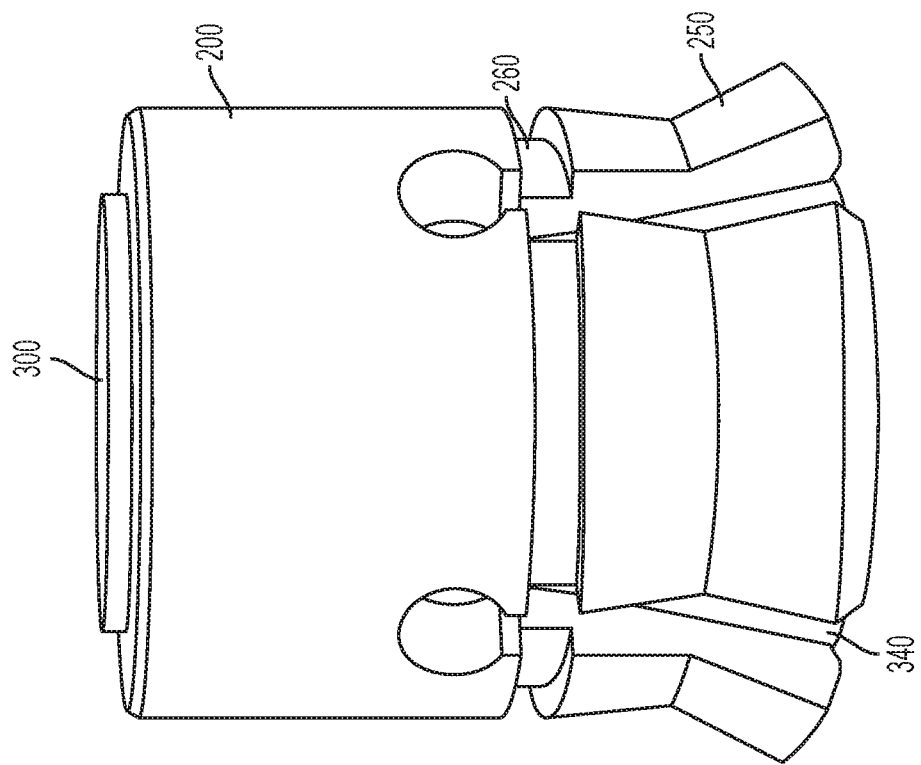
FIG. 8C shows a side perspective view of the anchor of FIG. 3 in the post set configuration.

Installation of anchor 100 can then be completed when the powered hammer/hammer drill mechanism is driven so that shoulder 846 drives sleeve 200 over plug 300. FIG. 8C shows a side view of an anchor 100 in the installed configuration and FIG. 8D shows a cross-sectional view of anchor 100 of the present invention in the installed configuration. As sleeve 200 is forced over plug 100, legs 250 each ride up on increasing radius portion 350 and forcing a lower portion 240 of sleeve 200 outward radially. As legs 250 are forced outward, bending stresses at waistband 260 increases and since the sleeve wall diameter is reduced at waistband 260, each leg begins to bend outward at waistband 260. The result is a sort of rotation of lower portion 240 of the sleeve where lower portion 240 is supported in the new set rotated position by plug 300's increasing diameter portion 350.

Figure 8E:
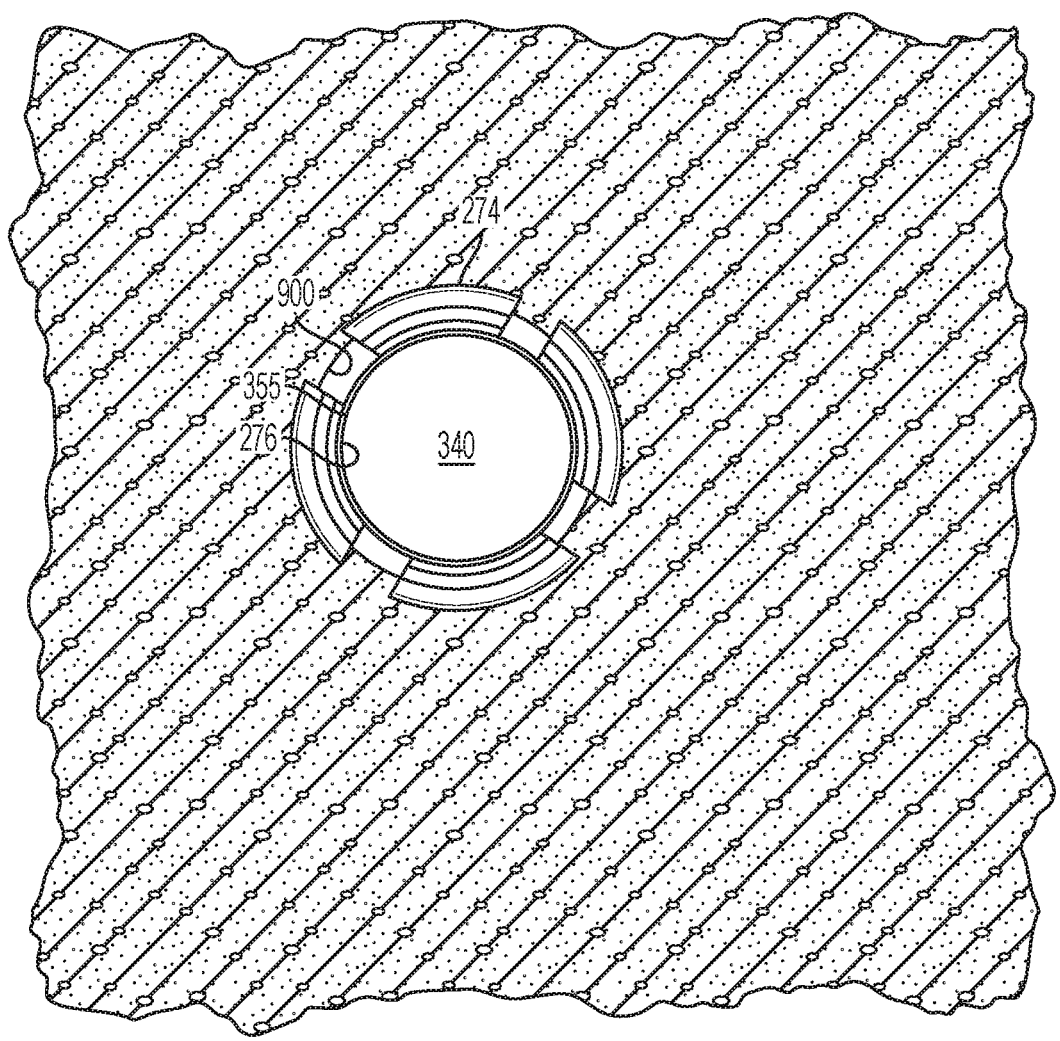
FIG. 8E shows a bottom view of the anchor of FIG. 3 set in a portion of concrete that is broken out of a concrete surface to reveal a bottom portion of the set anchor, the failed surface of the concrete, and the concrete hole.

Also as legs 250 are forced outward, edge 274 is forced into the surround concrete wall of the concrete hole into which the anchor is to be set. The forcing results from impact to sleeve 200 which urging legs 250 over increasing diameter portion 350 and outward into the concrete hole wall forcibly displacing a portion of the concrete to extend radially past the hole wall 900. FIG. 8E shows a concrete portion broken out of a concrete slab to reveal a bottom view of a set anchor 100. FIG. 8E clearly shows that after setting, edge 274 is lodged in the concrete hole 900 radially outward past the concrete hole wall. This extension of edge 274 past a radial limit of hole 900 and into the concrete prevents or resists radial movement of anchor 100 over and above the simple friction resistance methods of the prior art. Furthermore, flexing back of legs 250 and thus edge 274 as an anchor pulling out load is applied is resisted or prevented by increasing diameter portion 350 and transition portion 352.

Moreover, because the pulling out load is applied to plug 300 via locking member 322, increasing diameter portion 350 not only blocks or prevents radially inward collapsing when loading, but any further axial pull out force applied to increasing diameter portion 350 translates into a further radially outward force exerted on surface 276 of legs 250. In other words, increasing diameter portion 350 creates a dynamic continuous radially outward force on legs 250 rather than just a passive prevention of leg collapse because increasing diameter portion 350 of plug 300 is free to move axially relative to legs 250 of wedged sleeve 200. As a result, under the condition of a crack in the wall of concrete hole 900 which might increase the hole size, any pulling out load applied to plug 300 as the hole gets larger also will tend to further spread legs 250 apart radially to compensate as the hole gets larger. Furthermore, outer wall of the second threaded end of plug 300 may have a slightly smaller radius than the adjacent surrounding sleeve inner wall as shown in FIG. 4. The smaller plug wall radius can ensure that the walls can freely move past each other telescopically and minimize the friction caused between the inner and outer walls. Therefore, after installation when threads of plug 300 are loaded in the pull out direction, that load is transferred minimally (if at all) into friction, but mostly through the increased diameter portion 350 which in turn radially outwardly loads legs 250.

The final installation configuration of anchor 100 has terminal end 273 of legs 250 extending down proximate or to lower end 355 of plug 300. Because lower end 355 of plug 300 is cylindrical (not tapered like 350), when leg 250 gets jammed or forced between hole 900 and lower end 340, surface 276 of lower portion 272 gets force radially over and against a diameter transition 352. Lower portion 272 also gets forced inward by wall 900. Specifically, lower portion 272 if forced or bent inward toward lower end 355. Therefore, wall 900 pushes radially inward on an end of leg 250 (e.g., at 274) as diameter transition 352 pushes radially outward. This creates an radially outward flexing of a lower end of legs 250 which can be cantilevered relative to plug 300 to provide a dynamic or elastic outward biasing of legs 250 against wall 900 that may compensate for hole size variations do to cracking or other concrete failure over the course of an installation life. The present invention anchor 100 therefore provides at least two mechanisms (i.e., transferring axial plug load into outward radial force on legs and flexing of legs over transition 352) for dynamically resisting pull out displacement from hole 900. Furthermore, in that final installation configuration, at least a portion of surface 269 engages wall or hole 900 while surface 271 and edge 274 engage wall 900 and extend into wall 900. In one embodiment, diameter transition 352 is positioned to engage surface 276 such that a final position of wall 269 may be generally vertical. In this configuration, inner surfaces of portions 268 and 272 rotates to engage and become supported by an angled increasing diameter portion 350 and/or a lower portion 355.

Figure 9:
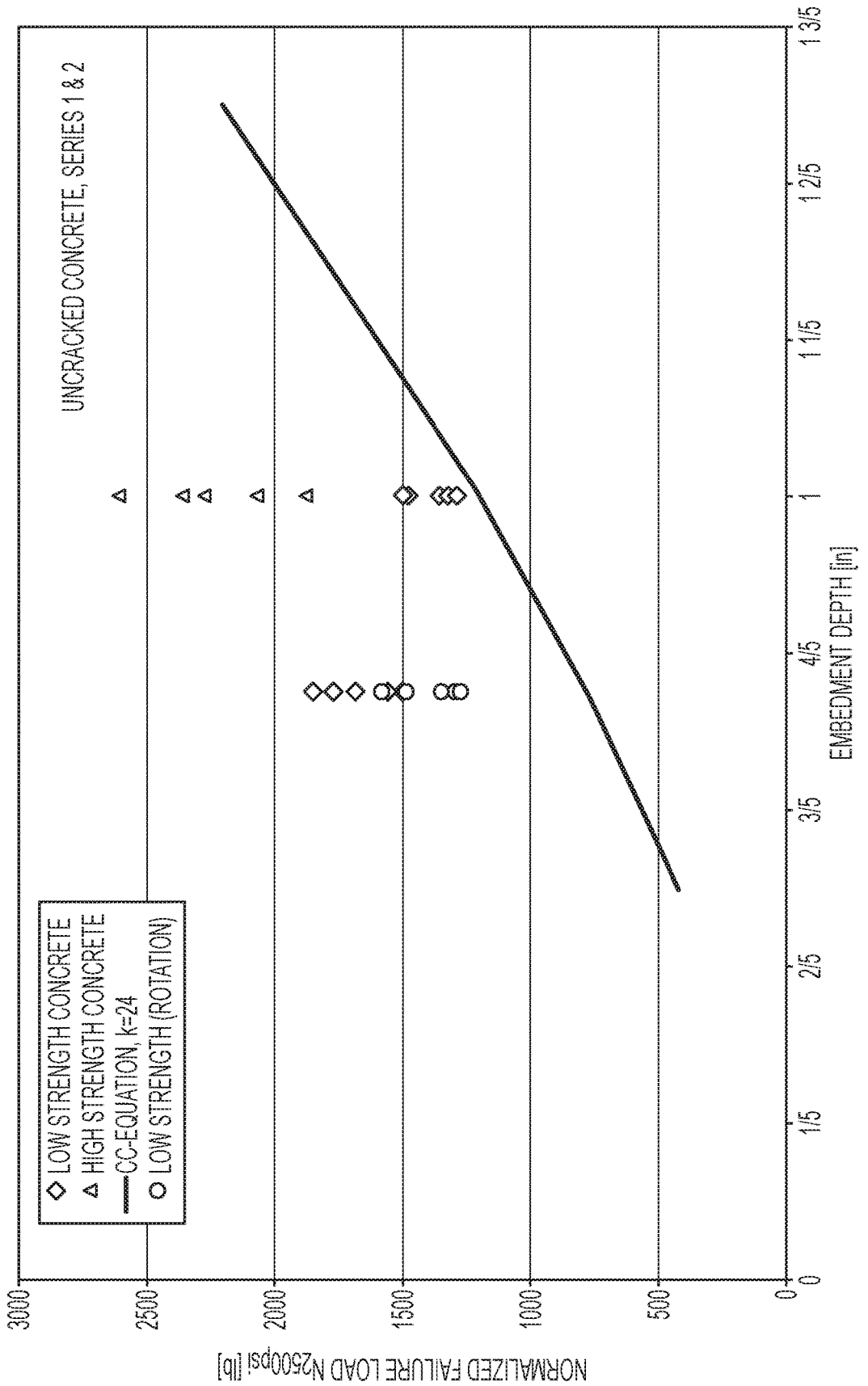
FIG. 9 shows a graph of load vs. embedment depth in un-cracked concrete for the anchor of FIG. 3.
Figure 10:
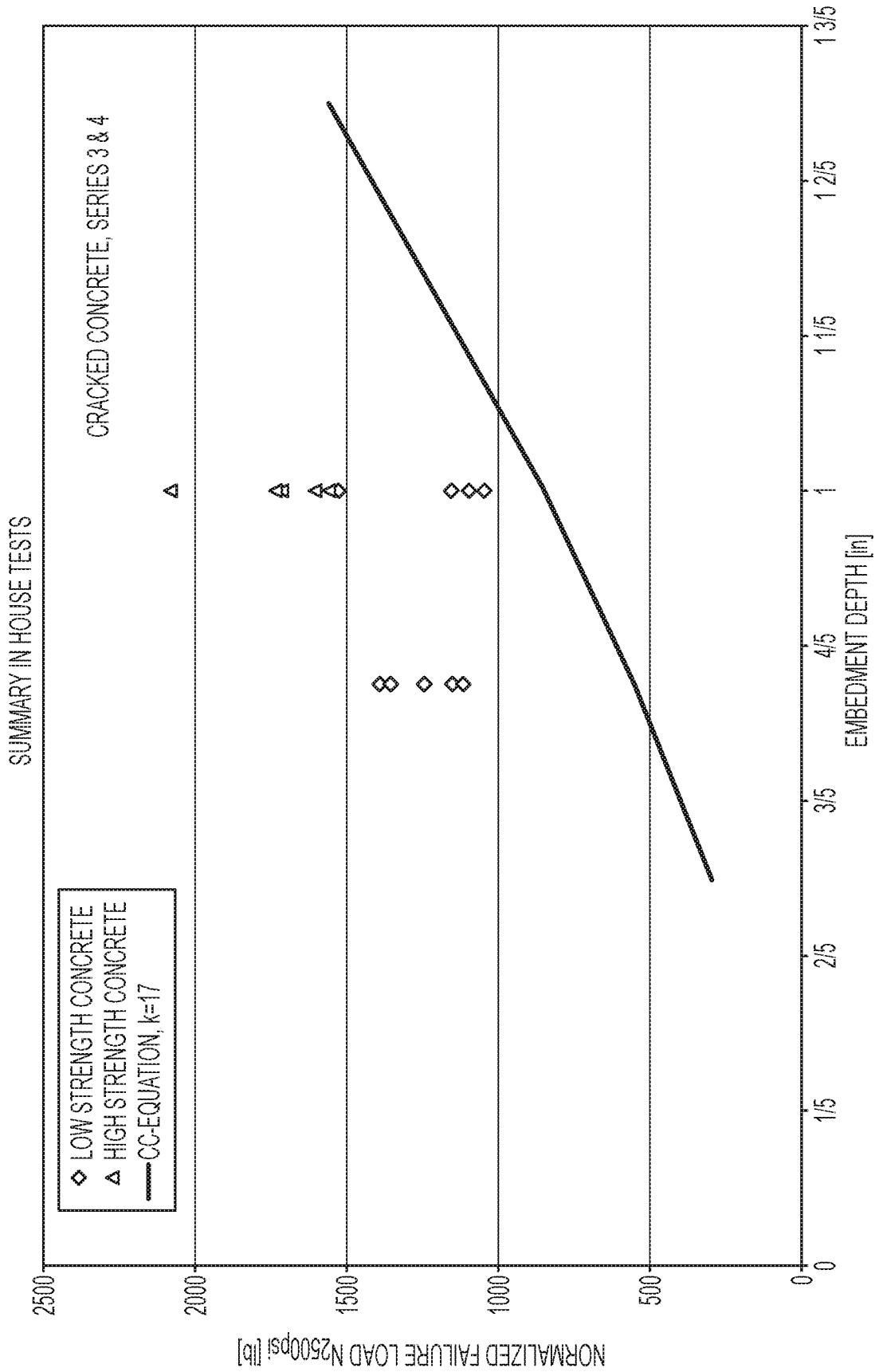
FIG. 10 shows a graph of load vs. embedment depth in cracked concrete for the anchor of FIG. 3.

FIG. 9 shows a graph of load vs. embedment depth in un-cracked concrete for the anchor of FIG. 3. FIG. 10 shows a graph of load vs. embedment depth in cracked concrete for the anchor of FIG. 3. Both of FIGS. 9 and 10 show lines defined by applicable building code equations where the present invention anchor 100 always fails at loads acceptably above code minimums for both high and low strength concretes.

According to national codes, the present invention anchor is capable of developing a tensile capacity of about 455 lbs in a cracked-concrete condition, in a base material comprised of normal-weight concrete with a compressive strength of about 2500 psi; is capable of developing a shear capacity of about 985 lbs in a cracked-concrete condition, in a base material comprised of normal-weight concrete with a compressive strength of about 2500 psi; is capable of developing a tensile capacity of about 410 lbs in a seismic condition, in a base material comprised of normal-weight concrete with a compressive strength of about 2500 psi; is capable of developing a shear capacity of about 895 lbs in a seismic condition according to national code, in a base material comprised of normal-weight concrete with a compressive strength of about 2500 psi. National codes can be found in ICC Evaluation Service's ICC-ES Report (ESR-3912) Division: 03 00 00—Concrete Section: 03 16 00—Concrete Anchors which is incorporated herein by reference in its entirety.

Figure 12B:
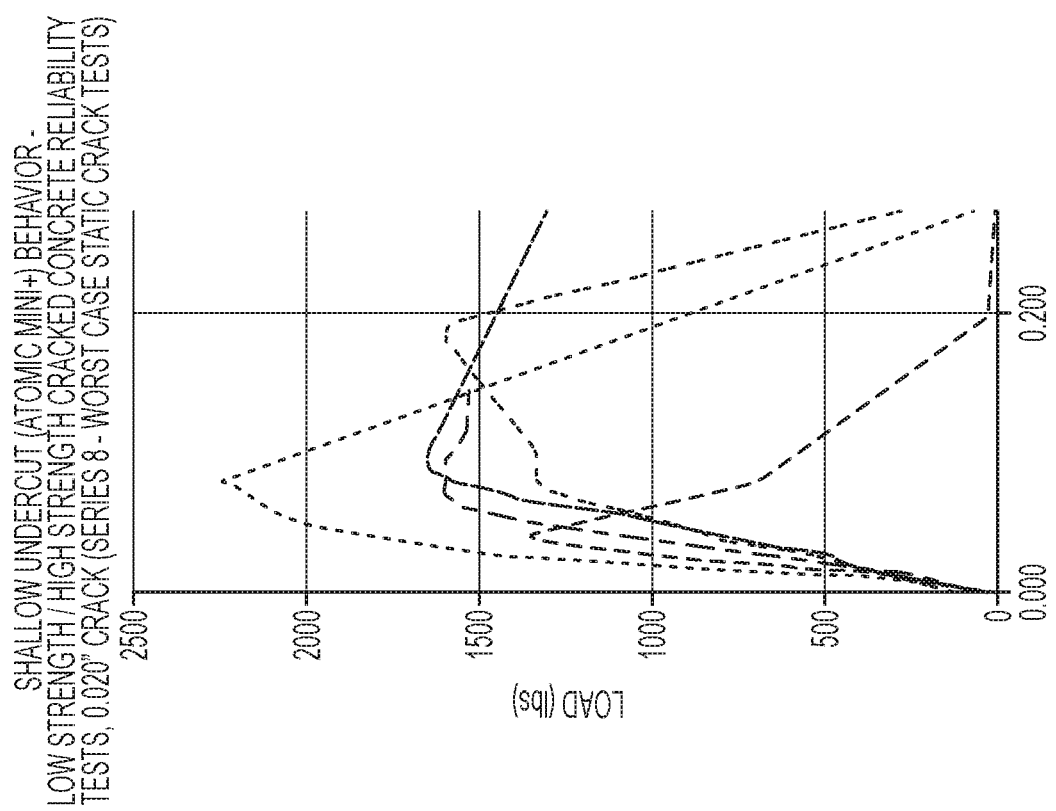
FIG. 12B shows a graph of another load vs. displacement of the anchor of FIG. 3.
Figure 12A:
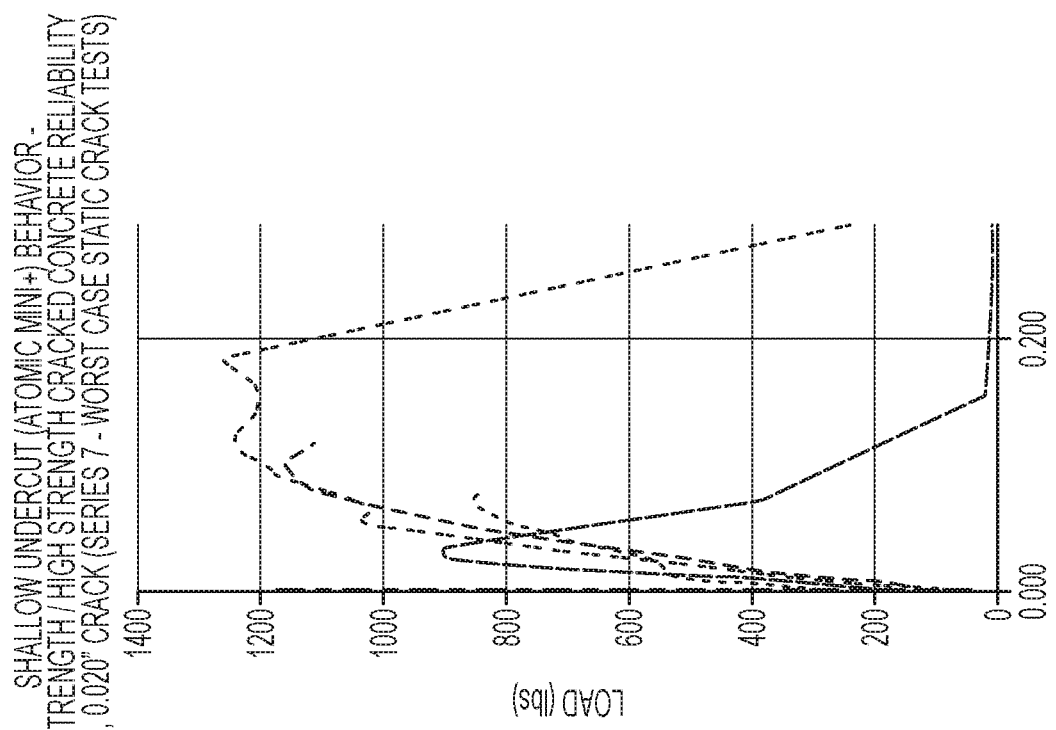
FIG. 12A shows a graph of load vs. displacement of the anchor of FIG. 3.
Figure 13A:
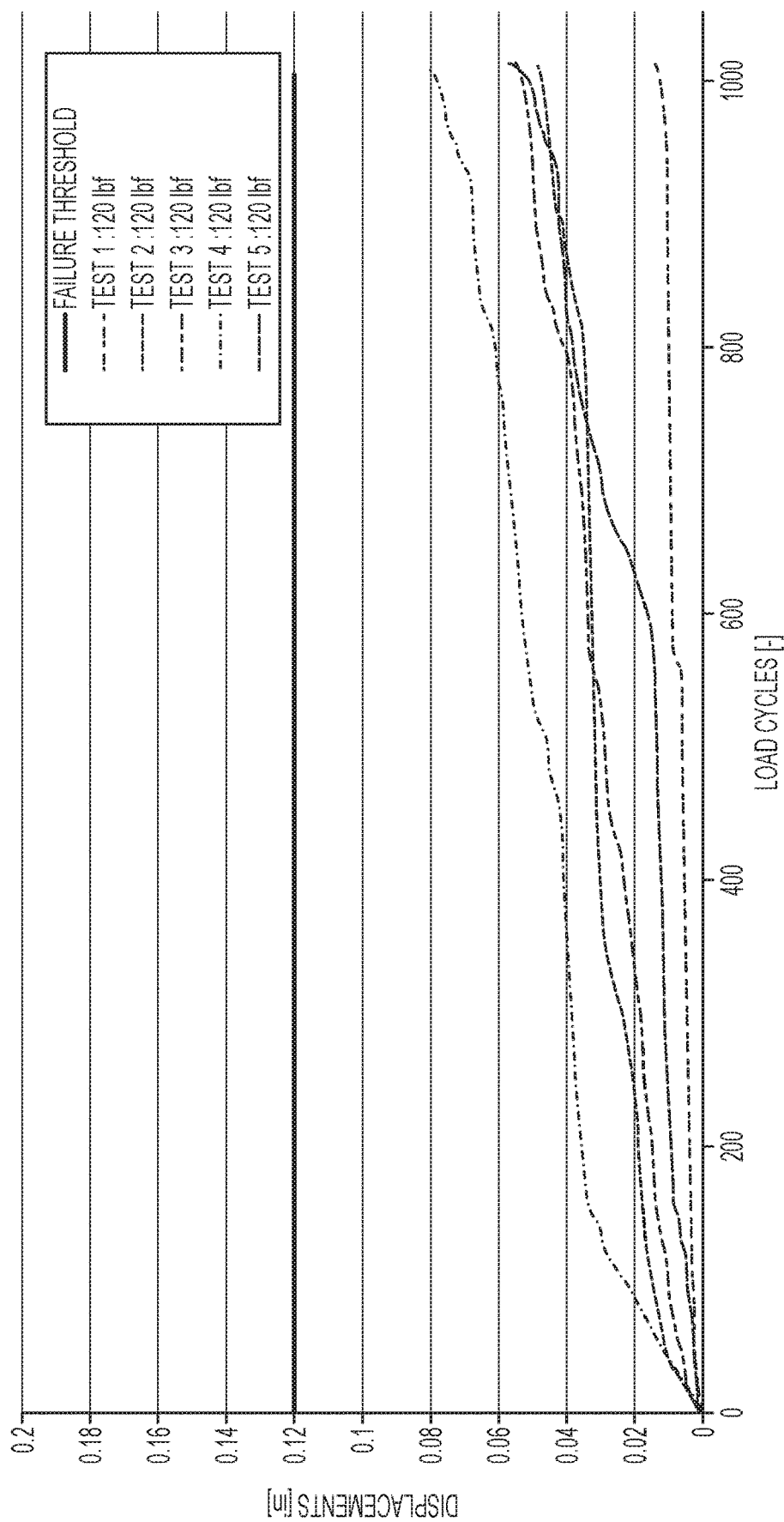
FIG. 13A shows a graph of displacement vs. cycles for a constant 120 lb load of the anchor of FIG. 3.
Figure 13B:
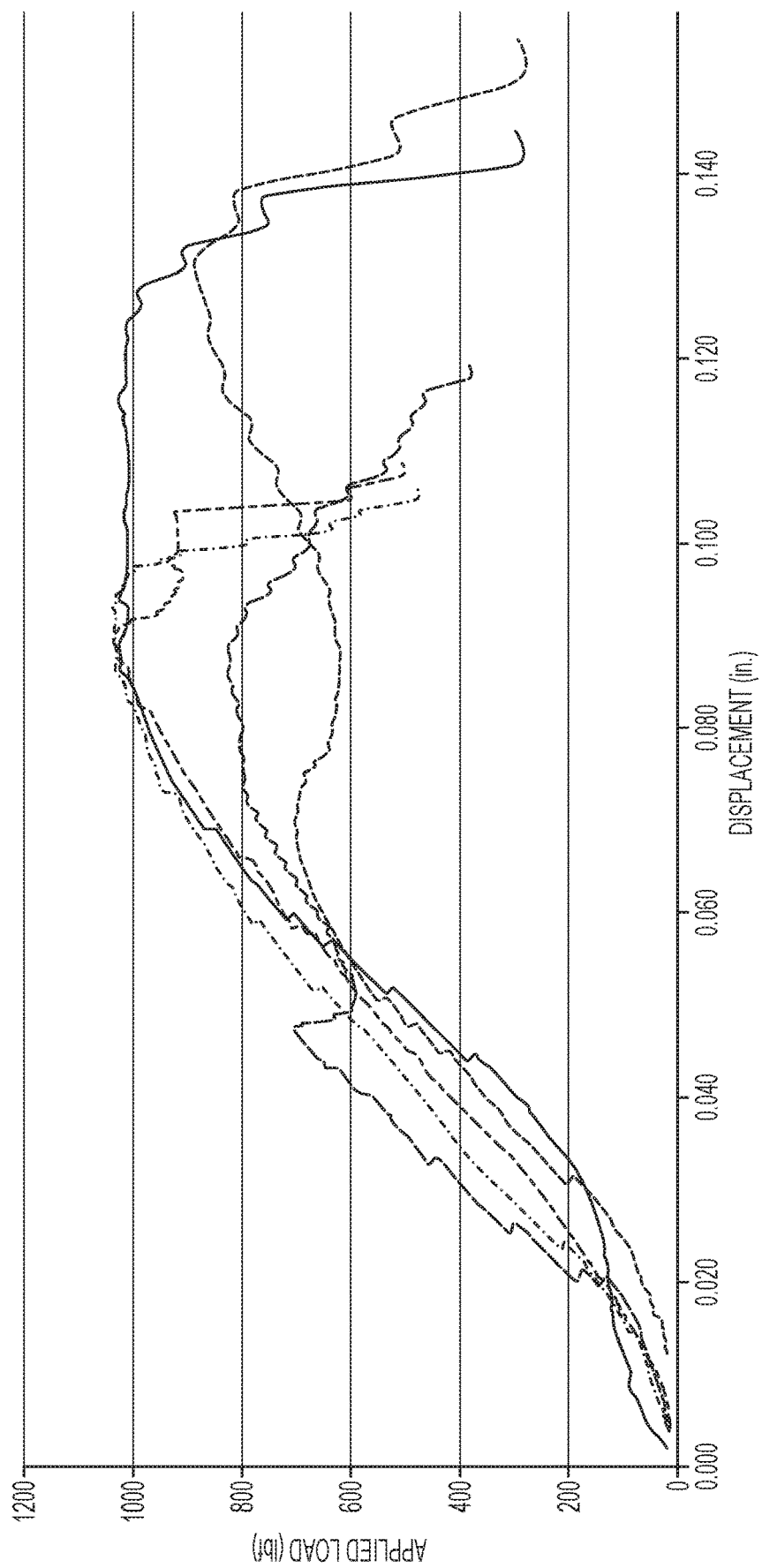
FIG. 13B shows a graph of load vs. displacement for an oversized hole using the anchor of FIG. 3.

FIGS. 11A and 11B show the results of a series of reliability tests for various concrete strengths, cracked and un-cracked concretes, and for embedment depths. The data shows acceptable values in all cases. In addition, FIGS. 12A and 12B shows a graph of load vs. displacement of the present invention anchor 100 in low and high strength cracked concrete. The various trials (i.e., lines of the graph) show a steep desirable and limited displacement of the anchor out of the sleeve as load (i.e. a pulling out load) is applied. The steeper curve shows the desirability of the present invention anchor 100 under the stated test conditions and which could not be achieved with the prior art anchor solution. Similarly, FIG. 13A shows a graph of displacement vs. cycles for a constant 120 lb load of the anchor of FIG. 3. The characteristic low slope behavior of the various trial graphs illustrate the hesitation of the present invention anchor 100 to pull out or to displacement. In addition, FIG. 13B shows a graph of load vs. displacement for an oversized hole using the anchor of FIG. 3. Here again, the characteristic low slope behavior of the various trial graphs illustrate the hesitation of the present invention anchor 100 to pull out or to displacement.

The invention claimed is:

1. An anchor for securing an object to a precast concrete structure, the precast concrete structure including a cylindrical opening in a surface of the concrete structure and the precast concrete structure further including an elongated tension member passing through the precast concrete structure, the elongate tension member further including ends secured to the precast concrete structure, the anchor comprising:
a sleeve and a plug, the sleeve and plug sharing a central longitudinal axis,
the sleeve including at least two legs extending toward a first end of the sleeve and the sleeve also including a second end opposite the first end, the sleeve further including a cylindrical through opening from the first end to the second end,
the plug including a first end for engaging the legs and a second end opposite the first end, the plug received in the cylindrical through opening along the central longitudinal axis, the plug further including a locking portion for connecting the anchor to the object,
a tapered portion disposed on at least one of the plug and the legs,
wherein when the plug and sleeve are forced telescopically relative to each other along the central longitudinal axis, the tapered portion forces the legs to expand radially outward, and
wherein the sleeve is ¾ inches or less in the longitudinal direction and the plug is ¾ inches or less in the longitudinal direction.

2. The anchor of claim 1, wherein a pull out load applied to the locking portion initiates a radially outward force on the legs.

3. The anchor of claim 1, wherein the concrete cylindrical opening includes a cylindrical wall having a radius and having a depth of approximately ¾ inches or less, the anchor via the first ends of the sleeve and plug being received in the concrete cylindrical opening to approximately the depth.

4. The anchor of claim 1, wherein in a collapsed, installed configuration, the anchor has a dimension in the longitudinal direction of about ¾ inches or less.

5. The anchor of claim 1, wherein the locking portion is a threaded opening.

6. The anchor of claim 1, further including a threaded rod, wherein the threaded rod includes a first end and a second end and the first end is couplable to a threaded opening in the plug, and
wherein a load applied to the threaded rod at the second end in an axial direction away from the concrete opening applies a direct radially outward force from the plug to the legs.

7. The anchor of claim 1, wherein the concrete structure is in the form of a slab, and wherein the slab includes a thickness, T in inches and the ratio of the thickness T to an anchor embedment depth, in inches, in the concrete cylindrical opening is greater than T.

8. The anchor of claim 1, wherein the anchor is capable of developing a tensile capacity of about 455 lbs in a cracked-concrete condition according to national code, in a base material comprised of normal-weight concrete with a compressive strength of about 2500 psi.

9. The anchor of claim 1, wherein the anchor is capable of developing a shear capacity of about 985 lbs in a cracked-concrete condition according to national code, in a base material comprised of normal-weight concrete with a compressive strength of about 2500 psi.

10. The anchor of claim 1, wherein the anchor is capable of developing a tensile capacity of about 410 lbs in a seismic condition according to national code, in a base material comprised of normal-weight concrete with a compressive strength of about 2500 psi.

11. The anchor of claim 1, wherein the anchor is capable of developing a shear capacity of about 895 lbs in a seismic condition according to national code, in a base material comprised of normal-weight concrete with a compressive strength of about 2500 psi.

12. A method of installing an anchor in a post tensioned concrete structure comprising the steps of:
providing a post tensioned concrete structure including a concrete surface,
drilling a cylindrical opening in the concrete surface, the opening having a depth of 0.75 inches or less,
the concrete cylindrical opening further including an open end and a closed end and a cylindrical wall having a radius, and
providing an anchor including a sleeve and a plug, the sleeve including at least two legs extending toward a first end of the sleeve and the sleeve also including a second end opposite the first end, the sleeve further including a cylindrical through opening from the first end to the second end, the plug including a first end for engaging the legs and a second end opposite the first end, the plug received in the cylindrical through opening, the plug further including a locking portion for connecting the anchor to the object, a tapered portion disposed on at least one of the plug and the legs, inserting the first ends of the sleeve and plug into the concrete cylindrical opening at a depth from the surface of no more than 0.75 inches, and forcing the plug and sleeve telescopically relative to each other so that the legs are forced radially outward, and so that the tapered portion prevents inward movement of the legs to lock the sleeve and the plug to the wall of the concrete cylindrical opening.

13. The method of claim 12, where in the step of providing an anchor including a sleeve and a plug is the step of providing an anchor with a sleeve and a plug each having a longitudinal dimension of ¾ inches or less.

14. An anchor system for securing an object to a structure comprising in combination:

a concrete structure including a concrete cylindrical opening in a surface thereof, the concrete cylindrical opening including an open end and a closed end, and a anchor including a sleeve and a plug, the sleeve including at least two legs extending toward a first end of the sleeve and the sleeve also including a second end opposite the first end, the sleeve further including a cylindrical through opening from the first end to the second end, the plug including a first end for engaging the legs and a second end opposite the first end, the plug received in the cylindrical through opening, the plug further including a locking portion for connecting the anchor to the object, a tapered portion disposed on at least one of the plug and the legs, wherein when the plug and sleeve are forced telescopically relative to each other, the legs are forced radially outward as a result of the tapered portion.

15. The anchor system of claim 14, wherein the concrete cylindrical opening includes a cylindrical wall having a radius and having a depth of approximately ¾" or less, the anchor via the first ends of the sleeve and plug being received in the concrete cylindrical opening to approximately the depth.

16. The anchor system of claim 14, wherein a leg of the sleeve extends radially outward past the wall and the tapered portion preventing inward movement of the legs to lock the sleeve and the plug in turn in the concrete cylindrical opening.

17. The anchor system of claim 14, wherein the concrete structure is a post tensioned concrete structure.

18. The anchor system of claim 17, wherein the post tensioned concrete structure includes a wire passing through the structure, tension in the wire being applied primarily at ends of the wire.

19. The anchor system of claim 18, further including a mechanism for adjusting the tension of the wire.

20. The anchor of claim 14, wherein the locking portion is located on the plug and a pull out load applied to the locking portion translates into a radially outward force on the legs.

21. The anchor of claim 14, wherein in a collapsed, installed configuration, the anchor has a dimension in the longitudinal direction of about ¾ inches or less.

\* \* \* \* \*